Patented Feb. 18, 1936

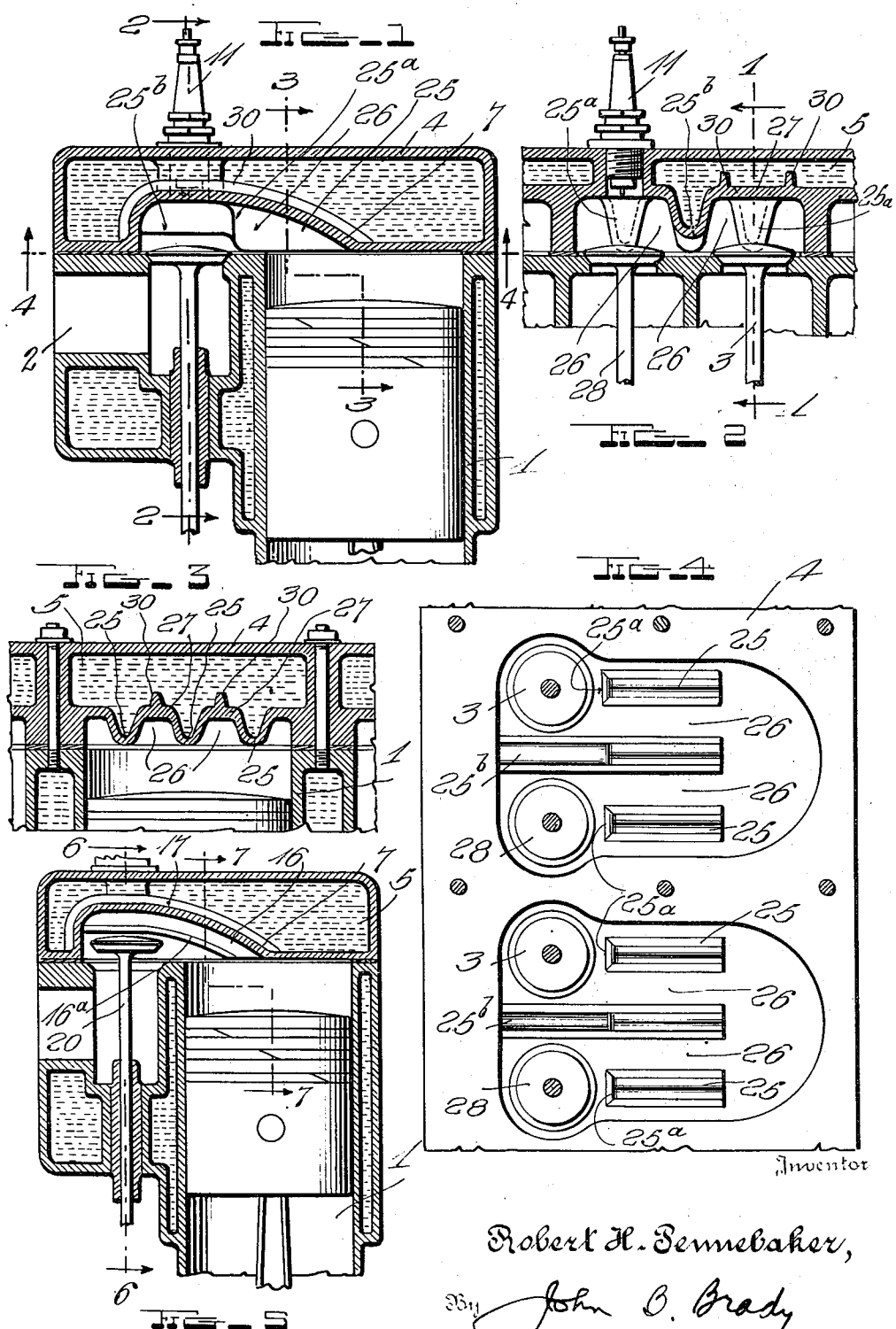

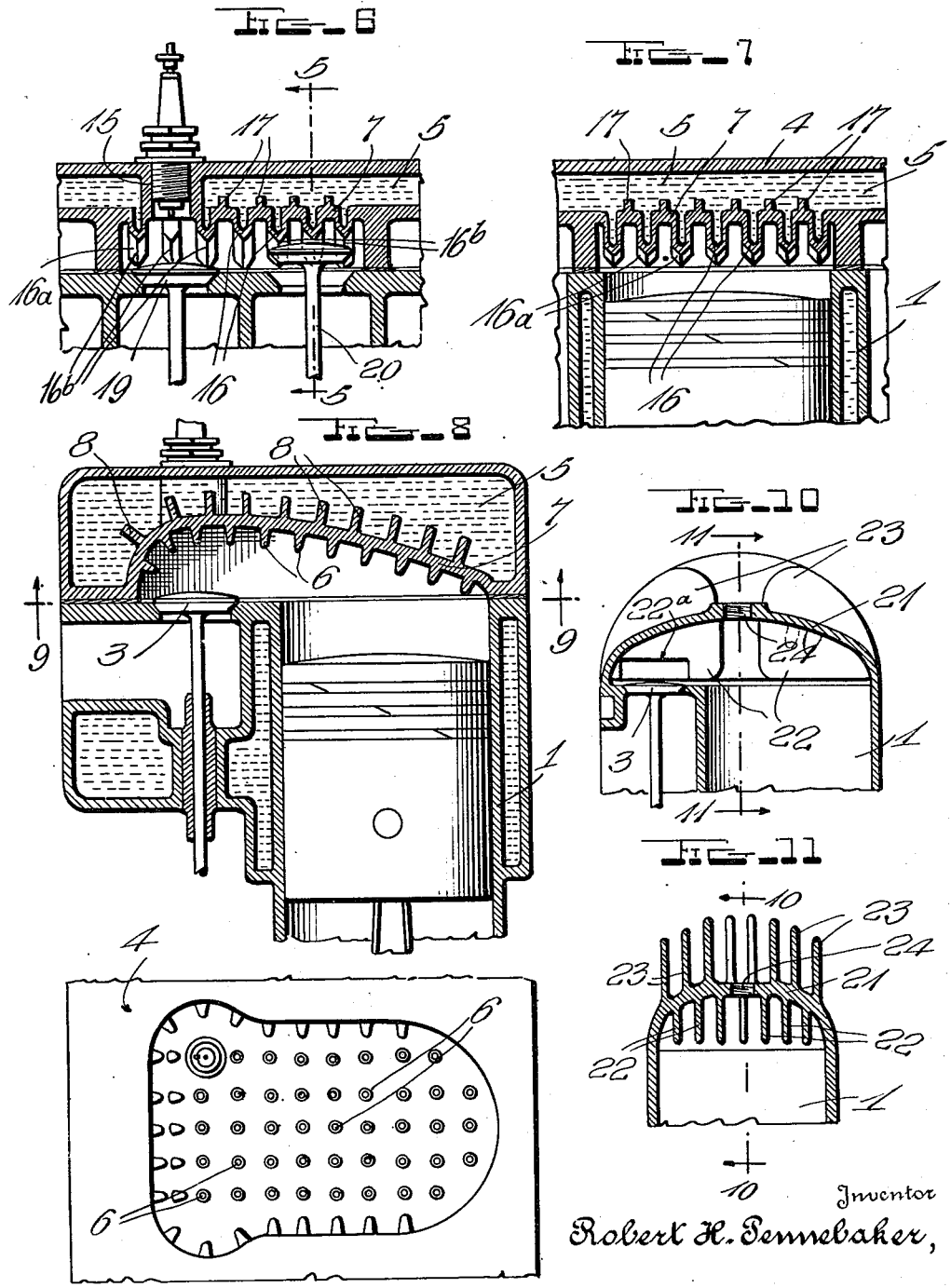

2,030,894

UNITED STATES PATENT OFFICE 2,030,894

CYLINDER HEAD

Robert H. Pennebaker, New Orleans, La.

Application August 4, 1933, Serial No. 683,667

9 Claims. (Cl. 123—173)

My invention relates broadly to internal combustion engines and more particularly to a construction of cylinder head for internal combustion engines.

This application is a continuation-in-part of my copending application Serial No. 586,410, filed January 13, 1932, for Cylinder heads.

One of the objects of my invention is to provide a construction of cylinder head for internal combustion engines having means for increasing the thermodynamic efficiency of the engine.

Another object of my invention is to provide a construction of cylinder head for internal combustion engines in which the surface area of the combustion chamber is increased and the volume of the combustion chamber reduced.

Still another object of my invention is to provide a construction of cylinder head for an internal combustion engine arranged to liberate and dissipate heat rapidly for maintaining the cylinder head relatively cool and permitting the use of higher compression and the reduction of detonation effects.

A further object of my invention is to provide a construction of cylinder head having heat absorbent members projecting into and extending outwardly from the head of the cylinder for conducting heat rapidly away from the cylinder and insuring the maintenance of the cylinder at relatively low temperature.

A still further object of my invention is to provide a construction of cylinder head having means extending into the cylinder head and projecting beyond the limits of the cylinder head and permitting the circulation of a cooling fluid such as air or water for extracting heat from the cylinder head and reducing the temperature thereof.

Another object of my invention is to provide means disposed within a cylinder head which will permit cooler running and operation of the valves, especially the exhaust valve.

Still another object of my invention is to provide a construction of cylinder head having a series of parallel extending vanes or corrugations projecting interiorly of the cylinder head and shaped to allow a cooling medium to pass therethrough for continuously extracting heat from the cylinder head for maintaining the temperature of the cylinder relatively low at the time the exhaust valve is open and during the exhaust and intake cycle of the engine.

Other and further objects of my invention reside in the construction of cylinder head for internal combustion engines as set forth more fully in the specification hereinafter following by referring to the accompanying drawings, in which:

Figure 1 is a fragmentary transverse vertical section through the head of an internal combustion engine taken substantially on line 1—1 of Fig. 2; Fig. 2 is a vertical longitudinal section taken on line 2—2 of Fig. 1; Fig. 3 is a similar view taken on line 3—3 of Fig. 1; Fig. 4 is a horizontal sectional view taken on line 4—4 of Fig. 1, and illustrating the downwardly depending corrugations in the cylinder head which serve to diffuse the heat from the cylinder and increase the surface area of the combustion chamber, while reducing the volume thereof; Fig. 5 is a transverse vertical sectional view showing a modified form of my invention taken substantially on line 5—5 of Fig. 6; Fig. 6 is a longitudinal sectional view taken on line 6—6 of Fig. 5; Fig. 7 is a similar view taken on line 7—7 of Fig. 5; Fig. 8 is a modified form of cylinder head embodying the subject matter of my invention; Fig. 9 is a horizontal section taken on line 9—9 of Fig. 8; Fig. 10 is a cross-section taken through the cylinder head of an air cooled engine to which the cylinder head of my invention is applied taken substantially on line 10—10 of Fig. 11; and Fig. 11 is a cross section taken through the air cooled cylinder head of an air cooled engine taken substantially on line 11—11 of Fig. 10.

My invention provides means for rapidly dissipating the heat which is generated at the head of the cylinder either through the medium of cooling water or by the circulation of air. I preferably provide an arrangement of corrugations which are directed towards the interior of the cylinder and serve to extract heat from the cylinder for rapid radiation. I may construct the heat extracting members integral with the head of the cylinder or the heat extracting members may be inserted and secured in the cylinder head. The heat extracting members may be solid or hollow in cross section and may extend both below and above the surface of the head of the cylinder. I may provide hollow parallel extending fins in the cylinder head for the circulation of cooling water or cooling fluid. These fins are so constructed as not to interfere with the operation of the valves or the functioning of the spark plug or the removal or insertion of the spark plug. The heat dissipating system of my invention is applicable both to water cooled engines in which the heat extracting members, whether of the solid type, the corrugated or the fin construction, are subject to the circulation of cooling fluid, or my invention may be applied to air cooled engines in which the heat extracting members extend externally of the cylinder head and serve to dissipate heat to the atmosphere. The rapid extraction of heat from the cylinder head serves to increase the thermodynamic efficiency of the engine and permits the use of higher compression and reduces detonation to a much lower minimum than the present type of cylinder head with the use of the present types of fuels including high test gasoline and antiknock fuels.

My invention may be embodied in a number of different constructions and the forms described particularly hereinafter are to be considered in the illustrative sense and not as limiting my invention to a particular construction.

Referring to the drawings in detail, reference character 1 designates the engine cylinder having a valve port 2 connected therewith with a valve 3 interposed between the valve port 2 and the cylinder 1. I provide a cylinder head 4 having a fluid circulating jacket 5 therein and having its lower surface equipped with the heat extracting members of my invention. In the form of my invention illustrated in Figs. 1–4, the heat extracting members are in the form of corrugations 25. The corrugations 25 extend parallel one to the other in such spaced relation that channels 26 are provided between the corrugations 25 for the inflow and outflow of the explosive mixture and discharge gases. The portions of the wall 7 of the cylinder head which are intermediate the downwardly extending portions of the corrugations are represented at 27 and have upwardly extending web members 30 thereon which provide means for transferring heat to the cooling water in the cooling jacket 5, which heat is transferred by conduction through the corrugations 25 from the cylinder. That is to say, the downwardly extending portions of the corrugations 25 absorb the heat from the combustion chamber and conduct the heat through the material of the wall 7 for delivery to the intermediate portions 27 for transfer through the web members 30 to a cooling fluid circulating in the jacket 5. The corrugations 25 are so shaped that minimum resistance is offered to the inflow and outflow of the explosive mixture or the discharge gases. Furthermore, the corrugations terminate adjacent the valves to avoid any interference with respect to the normal movement of the valves or the surging of the intake or exhaust gases, as shown in Fig. 4.

Figs. 1, 2 and 4 show the manner in which that corrugation which is aligned with spark plug 11 terminates at 25a. The corrugation which is immediately behind the corrugation cut away at 25a is shown at 25b elevated in such manner that there is no danger of gases pocketing directly beneath the corrugations. A symmetric arrangement is provided for each of the valves 3 and 28 in each cylinder. The pocket-like recesses which are formed in the corrugations to allow free movement of the valves, serve to bring the cooling water which passes over the inside surface of the corrugations to a point immediately adjacent the peripheral edges of the poppet valves, thereby insuring the maintenance of the poppet valves under relatively cool operating conditions, thus avoiding warping of the valves under conditions of excessive heat absorption.

Figs. 5, 6 and 7 illustrate a form of my invention in which the heat extractors have the form of fins extending parallel one to the other at spaced intervals laterally across the interior of the head of the cylinder. I have illustrated the fins at 16 depending downwardly towards the cylinder from the fluid cooling jacket 5. The fins are hollow to allow the free circulation of cooling fluid. The fins extend adjacent the spark plug opening 15. The spark plug opening 15 receives the spark plug for the engine cylinder. The fins 16 are cast integral with the wall 7 of the cylinder head and intermediate the fins 16 and projecting upwardly in a direction opposite to the direction of the fins 16 and formed integral with the wall 7 I provide solid fin members 17 which project into the fluid circulating path in fluid cooling jacket 5. The fins 17 are solid and extend in planes parallel one to the other and intermediate the plane of the hollow fins 16. Heat which is absorbed by the fins 16 is conductively transferred through the wall 7 to the fins 17 and then dissipated into the cooling fluid which circulates in the fluid circulating jacket 5. The hollow fins 16 are tapered at their extremities as indicated at 16a. The cooling fluid penetrates to the extreme end of the fins 16 and serves to extract heat with maximum efficiency. I have illustrated my invention in connection with a type of engine having conventional inlet and exhaust valves in the cylinder head. The valves are indicated at 19 and 20. In order to provide for the movement of the valves 19 and 20 during the operating cycle of the engine, I so shape the hollow fins 16 that sufficient clearance is provided which permits the upward movement of the valves without obstruction and allows the proper surging of the inlet and exhaust gases. I have indicated the clearance zones generally in Fig. 6 in which it will be observed that the fins 16 provide clearance zones at 16b immediately over the valves 19 and 20. That is to say, the hollow fins 16 have sufficient clearance immediately above the valves so that as the valves move during the cyclic operation of the engine there is no tendency for the retardation of the intake or the exhaust gases.

In the form of invention illustrated in Figs. 8 and 9 the heat extracting members are constituted by pins 6 integrally connected with the wall 7 of the cylinder head. The pins 6 are directed downwardly on axes which are normal to tangents drawn to the surface of the wall 7. I provide heat distributing members 8 integrally connected with wall 7 and extending in the opposite direction from pins 6. The pins 8 are disposed intermediate the pins 6 and are submerged in the cooling fluid in jacket 5. Heat which is extracted by pins 6 is conductively transmitted to wall 7 and thence conductively transmitted to pins 8 from which the heat is dissipated through the cooling fluid which circulates in jacket 5. As shown in Fig. 9, the pins 6 are uniformly spaced throughout the area of the cylinder head and distributed over the wall 7, and by referring to Fig. 8 it will be seen that the pins 8 are arranged in staggered relation to the pins 6, thereby assuring a very good transmission of heat from the pins 6 through the wall 7 and pins 8 to the cooling fluid in the jacket 5.

In Figs. 10 and 11 I have shown my invention as applied to an air cooled engine. The head of the air cooled engine is designated at 21 having downwardly depending fins 22 projecting into the engine cylinder 1 and upwardly projecting fins 23 disposed in planes intermediate the inwardly directed fins and extending outwardly from the head in staggered relation to the fins 22 for dissipating the heat which is connected through the inwardly directed fins 22 and end wall 21. This construction is particularly adapted for air cooled aircraft engines. The fins 22 interiorly of the cylinder head extend endwise toward the valve 3 so that there is no resistance or distortion of the outflowing or inflowing gases which would occur if the gases should come into contact with fins extending normal to the direction of flow of the gases. A screw threaded recess 24 is provided for receiving a spark plug in the head of the air cooled engine. The valve 3 is adapted to rise into the recess 22a formed in the interiorly projecting fin 22. This recess provides means for maintaining the valve relatively cool and also serves as a guide for the head of the valve during the opening and closing movement thereof. The fins not only serve as cooling means but it will be seen that as the valves move to an open position the marginal edges of the valves are protected by the fins and bending of the valve stems by side strain thus avoided.

The heat absorbing or extracting members which project downwardly from the cylinder head resemble a porcupine arrangement. Similarly the heat distributing members which project upwardly are assembled in porcupine arrangement for the rapid dissipation of heat conducted therethrough from the heat absorbing or extracting members.

The parallel fins which project both upwardly and downwardly from the cylinder head are so spaced as to provide pockets therebetween from which heat is rapidly extracted from the upper portion of the cylinder.

The cylinder head construction of my invention operates to substantially improve the efficiency of engine operation and permits the use of higher compression with a reduction in detonation. While I have described my invention in certain of its preferred embodiments I desire that it be understood that modifications may be made and that no limitations upon my invention are intended other than are imposed by the scope of the appended claims.

What I claim as new and desire to secure by Letters Patent of the United States is as follows:

1. In an internal combustion engine, a cylinder, a head for said cylinder defining a cooling jacket, a plurality of hollow parallel extending fins projecting downwardly from said head toward the interior of said cylinder, said hollow fins being closed at their lower extremities and having their upper ends opening into the cooling jacket for providing a path for the circulation of cooling medium for effecting the extraction of heat from said cylinder, and means projecting upwardly into said cooling jacket intermediate said hollow fins for dissipating heat extracted by said hollow fins from said cylinder.

2. In an internal combustion engine, a cylinder, a head for said cylinder, a fluid cooling jacket connected with said head, a plurality of parallel hollow fins extending downwardly from said head toward the interior of said cylinder, with their upper ends communicating with the jacket, a plurality of upwardly projecting fins connected with said head in staggered relation to said hollow fins for conveying heat extracted by said hollow fins through said cylinder head for dissipation through said fluid cooling jacket.

3. In an internal combustion engine, a cylinder, a cylinder head therefor, a fluid cooling jacket connected with said cylinder head, a plurality of hollow fins depending downwardly from said cylinder head in spaced parallel planes parallel one to another and having their upper ends opening into the cooling jacket for receiving and discharging cooling fluid from said fluid cooling jacket, and fins connected with said cylinder head and projecting upwardly in staggered relation to said hollow fins for transferring heat to said cooling fluid from said hollow fins.

4. In an internal combustion engine, a cylinder, a head for said cylinder, a plurality of parallel extending hollow fins integrally connected with said cylinder head and depending downwardly therefrom, said fins being recessed above the engine valve positions for permitting operation of the valves without obstruction while extracting heat from the cylinder and dissipating said heat into the fluid cooling jacket.

5. In an internal combustion engine, a cylinder, a head for said cylinder, a plurality of cooling fins extending downwardly toward said cylinder from said cylinder head, and valve pockets defined by said fins for conducting heat away from the valves adjacent said fins for maintaining said valves cool while in running operation.

6. In an internal combustion engine, a cylinder, a head for said cylinder, valves for said cylinder, and a multiplicity of fin-like heat extractors disposed in parallel relation and carried by said head about and above the valves in the combustion chamber, and serving to extract heat from the valves and cylinder and formed to guide the movement of the valves into and out of a closed position.

7. In an internal combustion engine, a cylinder, a head for said cylinder, valves for said cylinder, and a multiplicity of transversely extending heat extractors carried by said head, disposed in the combustion chambers, and formed to guide the movement of the valves into and out of a closed position.

8. In an internal combustion engine, a cylinder, a head for said cylinder, valves for said cylinder, and a plurality of fin-like heat extractors carried by said head and disposed in spaced parallel relation and defining pockets to receive the valves when the valves move to an open position.

9. In an internal combustion engine, a cylinder, a head for said cylinder, valves for said cylinder, and depending heat extractors carried by said head and disposed over the cylinder and valves, portions of the heat extractors disposed over the valves being reduced in depth to define pockets receiving the valves when the valves move upwardly to an open position.

ROBERT H. PENNEBAKER.